(No Model.)
W. W. DOOLITTLE.
LIQUID DISTRIBUTER FOR REFRIGERATING MACHINES.
No. 266,680. Patented Oct. 31, 1882.
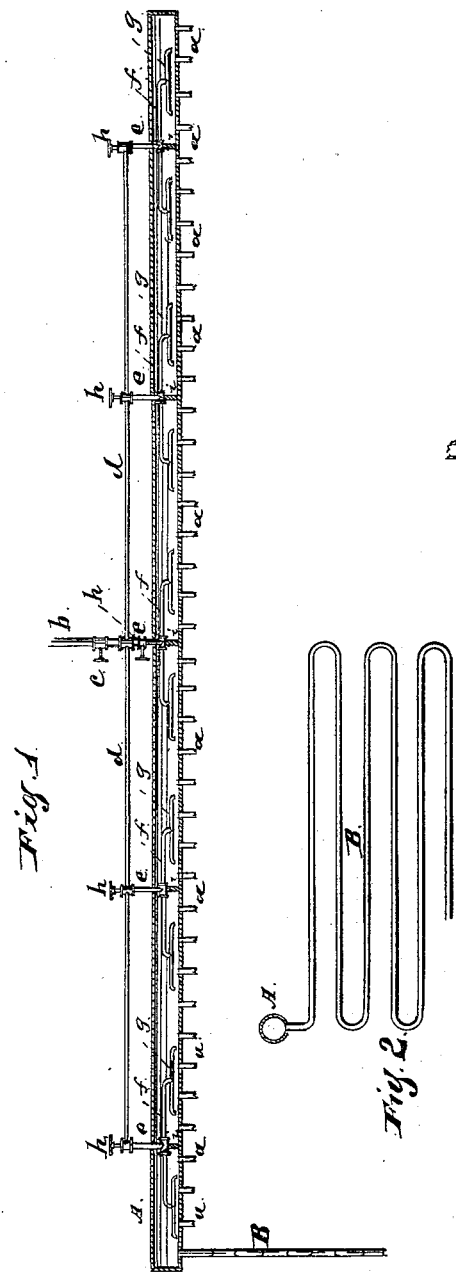
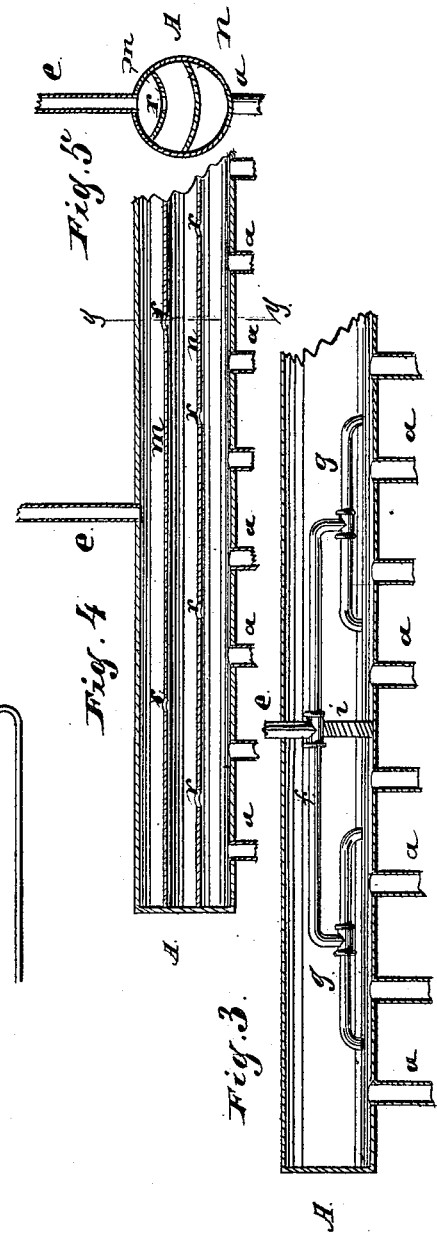
Witnesses:
Albert N. Adams.
Edgar B. Bond
Inventor:
William W. Doolittle.
By West & Bond Attys

United States Patent Office.

WILLIAM W. DOOLITTLE, OF CHICAGO, ILLINOIS.

LIQUID-DISTRIBUTER FOR REFRIGERATING-MACHINES.

SPECIFICATION forming part of Letters Patent No. 266,680, dated October 31, 1882.

Application filed August 21, 1882. (No model.)

*To all whom it may concern:*

Be it known that I, WILLIAM W. DOOLITTLE, residing at Chicago, in the county of Cook and State of Illinois, and a citizen of the United States, have invented a new and useful Improvement in Liquid-Distributers for Refrigerating-Machines, of which the following is a full description, reference being had to the accompanying drawings, in which—

Figure 1 is a vertical section, some parts being in elevation. Fig. 2 is a cross-section of the pipe A, showing, also, one coil of pipe. Fig. 3 is an enlarged detail. Figs. 4 and 5 show a modification, Fig. 5 being a cross-section at line $y\ y$ of Fig. 4.

In refrigerating-machines it is common to use a number of coils, each connected with a manifold, through which liquid ammonia or other suitable fluid is supplied to the coils. Two of such coils are now connected with a short pipe from the manifold, in which short pipe a valve is placed, and one valve only controls the supply of the liquid to two coils. When a large number of coils are used the expense of so many valves is great.

The object of my invention is to provide improved devices, by the use of which a single valve can be made to control the supply of liquid to a much greater number of coils than at present, which I accomplish as hereinafter fully set forth.

In the drawings, A represents a manifold or main pipe, with which the several coils are connected, and through which the fluid passes to the coils.

$a$ are short pipes inserted in the pipe A, with each of which short pipes a coil is connected in any suitable manner; or if the coils were connected directly with the pipe A, then $a$ would represent the end of the several coils.

B is one of the coils.

$b$ is a main supply-pipe, through which the liquid ammonia or other fluid passes to the pipe A.

$c$ is a valve by which the flow of liquid through $b$ can be controlled or entirely cut off.

$d\ d$ are branch supply-pipes, communicating with the pipe $b$. As shown, there are five short branch pipes, $e$, the upper ends of which communicate with the branch pipes $d\ d$, while the lower ends pass through and a little way into the main pipe A, opening into a small pipe, $f$, at its center. The two ends of this small pipe $f$ open into small pipes $g$ at the center thereof, and the ends of these pipes $g$ open into the tube A.

$h$ are valves which control the flow of the liquid through the pipes $e$. The connections between the several pipes can be made in any known suitable manner.

It is important in refrigerating-machines that the refrigerating-liquid be distributed with uniformity through the several coils, which would not be the case if the same passed directly into the main pipe A at a single point. With devices constructed as shown in the drawings, the liquid is supplied through the pipe $b$, from which it passes first into the branch supply or distributing pipes $d$, from which pipes $d$ it passes through the pipes $e$ into the pipes $f$, thence into the pipes $g$, from which it flows into A, the flow through each of the pipes $e$ by one of the valves $h$, each valve $h$, when the parts are arranged as shown, controlling the flow of the fluid to eight coils.

The pipes $f$ might be located outside of the pipe A; but that would require an additional number of holes in such pipe A.

In Figs. 4 and 5 I have shown a modification, in which the pipe A is divided into compartments by means of two longitudinal partitions, $m\ n$, each of which is provided with holes $r$, through which holes the fluid passes from one compartment to another, and finally into the coils. With this modification I use the same number of valves as before and produce the same result.

I do not confine myself to the exact arrangement of valves and tubes or passages herein described. The principle of my invention could be employed to control either a less or a greater number of coils than above stated by a single valve.

When the modification is used the main supply-pipe $b$, the branch distributing-pipes $d$, and the short branch pipes $e$ will be used as described, except that the pipes $e$ will then open into the manifold A, the plates in the manifold taking the place of the small pipes $f$ and $g$.

The pipes $f\ g$ can be inserted at one end of the manifold, and then the pipes $e$ can be screwed into the pipes $f$, the opening in A, through which the pipes *e* pass, being secured against leakage in any known manner.

As shown in Figs. 1 and 3, the small pipes *f g*, located inside of the manifold A, serve the purpose of passages to distribute the liquid to different parts of the manifold. As shown in Fig. 4, the plates *m* and *n*, provided with holes *r*, form passages for the same purpose.

Supports *i* may be used beneath the pipes *f*, if desired.

What I claim as new, and desire to secure by Letters Patent, is as follows:

A main supply-pipe, *b*, distributing-pipes *d e*, and valves *h*, in combination with a manifold or pipe, A, provided upon the inside with distributing-passages, substantially as and for the purpose specified.

WILLIAM W. DOOLITTLE.

Witnesses:
B. A. PRICE,
ALBERT H. ADAMS.